UNITED STATES PATENT OFFICE 2,148,432

WATER-SOLUBLE CAPILLARY-ACTIVE SULPHONATES

Herman A. Bruson, Philadelphia, Pa., assignor to Röhm & Haas Company, Philadelphia, Pa.

No Drawing. Application January 27, 1938, Serial No. 187,158

11 Claims. (Cl. 260—512)

This invention relates to new water-soluble capillary-active substances which in their acid form have the general formula R—R'—O—A—SO₃H in which R is a cycloaliphatic hydrocarbon radical, R' is a sulphonated or unsulphonated aromatic nucleus of the benzene or naphthalene series nuclearly attached to R and A is a polyalkylene ether radical containing at least two carbon atoms in each alkylene group.

This application is a continuation-in-part of my co-pending applications Ser. Nos. 86,344, filed June 20, 1936, and 120,180, filed January 12, 1937, now matured into Patent Number 2,115,192 issued April 26, 1938, and Patent Number 2,107,367 issued February 8, 1938, respectively.

In Patent Number 2,115,192 there are disclosed salts of a series of acids having the general formula R—(O—A)ₙ—O—A—SO₃H in which R is an aromatic hydrocarbon radical which may have as a nuclear substituent an alkyl, cycloalkyl, aralkyl, or aryl radical, n is one or two and A is an alkylene radical having from two to four carbon atoms. The salts of these acids, particularly those of the alkali and alkali earth metals are all soluble in water and, hence, the alkali salts can be used as wetting agents for various purposes even in very hard water. The acids themselves are also good wetting agents.

In Patent Number 2,107,367 there is disclosed a similar series of compounds which, in addition to the —SO₃H group attached to the terminal carbon atom of the polyalkylene ether chain, also have one or more —SO₃H groups directly attached to the aromatic nucleus. These acids and their salts are also good wetting agents.

In both these patents compounds in which the aromatic groups are alkyl-substituted are specifically claimed.

The present application is directed specifically to those compounds of the above type, in which the aryl group carries a cyclo-aliphatic hydrocarbon radical as a substituent and which are particularly good wetting and emulsifying agents. The cycloaliphatic group may be a single, multiple or condensed ring and it may carry an alkyl, aryl, or aralkyl substituent.

It has been found that those compounds of the general formula R—R'—O—A—SO₃H and their salts in which R is a cycloaliphatic hydrocarbon radical containing at least ten carbon atoms inclusive of any alkyl substituent in the cycloaliphatic nucleus, and in which R' is a simple benzene or naphthalene nucleus are unusually active detergents, particularly for low-temperature washing and scouring operations. This is an entirely unexpected property because heretofore it was believed that only compounds containing long aliphatic chains, containing from 8 to 18 carbon atoms, had this property to any marked extent.

The aromatic nucleus may have other groups attached to it such as the methyl, ethyl, propyl, and isopropyl radicals, halogen, alkoxy, aryloxy, hydroxy alkyl or other inert groups. It may also contain more than one cycloaliphatic group or a sulphonic acid radical.

For example, compounds of the general formulas shown below are, in the form of their water-soluble salts such as the water-soluble metal, ammonium and amine salts, unusually active detergents, particularly for the removal of solid particles of dirt etc. from textile materials.

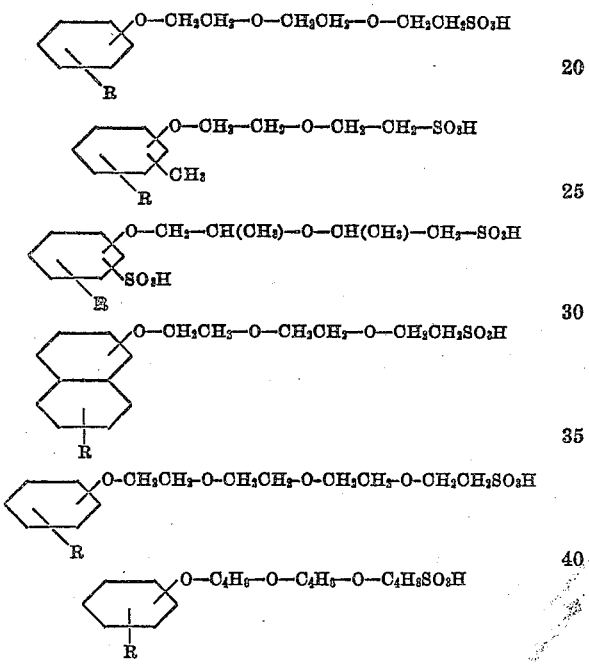

wherein R is one of the following cycloaliphatic hydrocarbon radicals:

(a) A dicyclic terpene hydrocarbon group, such as camphyl, bornyl, fenchyl.

(b) A monocyclic terpene hydrocarbon group, such as menthyl, terpenyl, naphthenyl (from naphthenic acid).

(c) A polynuclear hydroaromatic group, such as abietyl, hydroabietyl, tetrahydro-abietyl, decahydro-naphthyl, cholesteryl.

(d) An alkylated-, cyclo-alkylated-, arylated-, or aralkylated cyclohexyl group, such as methyl-cyclohexyl, ethyl-cyclohexyl, propyl-cyclohexyl, butyl-cyclohexyl, amyl-cyclohexyl, hexyl-cyclohexyl, cyclohexyl-cyclohexyl, octyl-cyclohexyl, dodecyl-cyclohexyl, phenyl-cyclohexyl, benzyl-cyclohexyl.

The substituent may be in the ortho, meta, or para position in the cyclohexylene ring with respect to the position of the aromatic nucleus. Furthermore, the cycloaliphatic hydrocarbon radical R can be in the ortho, meta, or para position in the aromatic nucleus R' with respect to the polyalkylene ether substituent.

The compounds that constitute the present invention may be prepared by the procedures disclosed in the above-mentioned patents. In general these processes consist in condensing one mol of a phenol or naphthol, having at least one nuclear cycloaliphatic hydrocarbon substituent, with slightly more than one mol of a dihalogeno polyalkylene ether, in which the halogen atoms are attached to terminal carbon atoms and separated by at least two carbon atoms from the nearest ether oxygen atom, in the presence of one mol of an alkali so that only one of the halogen atoms is replaced by a cycloaliphatic substituted aryloxy group, and subsequently heating the monohalogenated polyalkylene polyether, thus obtained, with an alkali metal sulphite in aqueous solution so as to replace the halogen atom with an —SO₃H group in the form of its alkali metal salt. The free sulphonic acids may be obtained from the salts by treating them with cold sulphuric or hydrochloric acid and from these free sulphonic acids the ammonium, amine or any metal salt may be prepared in the usual manner. One or more sulphonic acid groups may be introduced into the aromatic nucleus before or after condensing with the dihalogeno polyalkylene ether.

The following examples are given for the purpose of illustrating this invention, it being understood that they are not to be construed as limiting.

*Example 1*

A mixture consisting of 115 g. of camphylphenol, 286 g. of β,β'-dichlorodiethyl ether, 23.4 g. of sodium hydroxide, and 25 g. of water was stirred vigorously and heated under reflux for six hours at 110°–115° C. The water was distilled off, together with some dichlorodiethyl ether, the sodium chloride filtered off, and the filtrate fractionally distilled in vacuo.

125 g. of camphylphenoxy-ethoxyethyl chloride, $C_{10}H_{17}$—$C_6H_4$—O—$CH_2CH_2$—O—$CH_2CH_2Cl$, boiling at 205°–212° C./4 mm., was obtained.

A mixture consisting of 84 g. of the above camphylphenoxy-ethoxyethyl chloride, 30.2 g. of anhydrous sodium sulphite (97% $Na_2SO_3$) and 300 g. of water was stirred in an iron autoclave and heated for seven hours at 180°–190° C. (200 lbs. per square inch pressure).

Upon cooling, a jelly-like soap solution was obtained. Traces of free sulphide were removed by warming the product with 18 cc. of 10% hydrochloric acid until the odor of sulphur dioxide was no longer apparent. The product was then neutralized to a pH 7.6 with sodium hydroxide solution. The final paste obtained contained:

| | Per cent |
|---|---|
| Solids | 22.82 |
| $Na_2SO_3$ | .05 |
| NaCl | 6.3 |

It is a very active wetting, emulsifying, dispersing and cleansing agent.

Upon drying, it forms a waxy solid. By extraction with hot alcohol, the pure soap can be isolated free from sodium chloride or mineral salts. It has the formula Camphyl—$C_6H_4$—O—$CH_2CH_2$—
O—$CH_2CH_2SO_3Na$.

The free sulphonic acid may be conveniently obtained by treating a concentrated solution of this salt with concentrated hydrochloric acid. It may be converted to the ammonium, potassium, or ethanolamine salt by neutralization with ammonia, potassium hydroxide or ethanolamine respectively. By treatment with other metal oxides or hydroxides, for example those of zinc and aluminum, the corresponding polyvalent metal salts are obtained.

The camphylphenol used above was prepared by condensing borneol or camphene with phenol and consisted of mixed ortho and para isomers boiling at 145°–160° C./1–2 mm.

*Example 2*

A mixture consisting of 115 g. of camphylphenol, 374 g. of β-chloroethoxy-β'-chlorodiethyl ether, $ClC_2H_4$—O—$C_2H_4$—O—$C_2H_4Cl$, 23.4 g. of sodium hydroxide, and 25 g. of water was stirred and heated under reflux for six hours at 110°–115° C. After removal of the water, sodium chloride, and the excess of the dichloro polyalkylene ether, 135 g. of β(camphyl-phenoxyethoxy)-β'-chloro-diethyl ether, $C_{10}H_{17}$—$C_6H_4$—O—$C_2H_4$—O—$C_2H_4$—O—$C_2H_4Cl$, boiling at 247°–263° C./4 mm. was obtained.

A mixture consisting of 100 g. of this camphylphenoxy-ethoxy-chlorodiethyl ether, 35.8 g. of 97% sodium sulphite, and 400 g. of water was stirred in an autoclave and heated for six hours at 180°–190° C. On cooling, a white paste was obtained. This was treated with 10 cc. of 10% hydrochloric acid to expel sulphur dioxide, and neutralized to a pH 7 with caustic soda.

The final soap contained 32% solids and 5.8% sodium chloride.

It can be used directly as a soap and possesses extremely valuable detergent properties. It forms good suds and may be easily rinsed from fabrics by means of water without re-precipitating the dirt on the fabric as do many soaps. Thus the finished fabric retains its whiteness better than those washed with ordinary soaps. Upon evaporation to dryness and extraction with ethanol, the purified soap having the formula

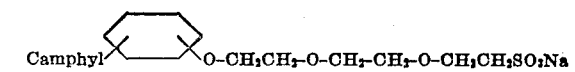

may be obtained as a pale, waxy mass.

*Example 3*

A mixture consisting of 400 g. of β,β'-dichlorodiethyl ether, 33 g. of sodium hydroxide, 50 g. of water, and 161 g. of mixed terpenic phenols (B. P. 140°–160° C./1 mm., obtained by condensing pinene or rectified turpentine with phenol) was stirred vigorously and boiled under reflux for six hours at 110°–115° C. The product was distilled to remove water, filtered to remove sodium chloride, and the clear filtrate distilled under reduced pressure. The compound $C_{10}H_{17}$—$C_6H_4$—O—$CH_2CH_2$—O—$CH_2CH_2Cl$ was obtained as a pale yellow oil boiling at 193°–200° C./4 mm., in which the $C_{10}H_{17}$ group corresponds to the terpenic group derived from turpentine.

84 g. of the above terpenic-phenoxyethoxyethyl chloride was mixed with 30 g. of sodium sulphite (97% Na₂SO₃) and 300 g. of water in a steel autoclave equipped with a stirrer, and heated with constant stirring at 180°–190° C. for seven hours. On cooling, a white, pasty soap was obtained, having useful detergent, emulsifying and deflocculating properties, and corresponding to the formula

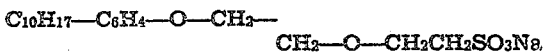

where $C_{10}H_{17}$ represents the terpenic group derived from turpentine, corresponding very probably to the mixed bornyl and isobornyl radicals.

A similar product, B. P. 215°–230° C./4 mm., obtained by condensing β,β'-dichlorodiethyl ether with alkali and "dipentene phenol", gave, upon treatment with sodium sulphite, a water-soluble soap. Dipentene phenol was obtained by condensing phenol with dipentene and is an oil boiling at 140°–150° C./1 mm.

Example 4

A mixture consisting of 95 g. of sec-octylcyclohexylphenol, 189 g. of β,β'-dichlorodiethyl ether, 13.5 g. of sodium hydroxide, and 15 g. of water was heated six hours while stirring constantly, at 110°–115° C. under reflux. After removal of the water, unchanged dichloroether and salt, distillation of the product in vacuo yielded β-(sec-octylcyclohexylphenoxy)-β'-chlorodiethyl ether

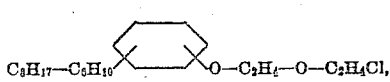

a pale yellow oil boiling between 225° and 250° C./3 mm.

The sec-octylcyclohexylphenol used above was prepared by condensing phenol with sec-octylcyclohexanol obtained by catalytic hydrogenation of sec-octylphenol.

150 g. of the sec-octylcyclohexylphenoxyethoxyethyl chloride obtained as above was mixed with 15.8 g. of sodium sulphite (97% Na₂SO₃) and 300 g. of water, and heated while stirring in an autoclave at 180°–190° C. for six hours. The pressure rose to 180 lbs. per square inch.

Upon cooling, a white, soap-like jelly was obtained, useful as a detergent and emulsifying agent.

Example 5

A mixture consisting of 172 g. of β,β'-dichlorodiethyl ether, 14 g. of sodium hydroxide, 15 g. of water and 73 g. of mixed terpenic cresols (B. P. 153°–167° C./2 mm. obtained by condensing pinene or rectified turpentine with ortho-cresol) was stirred vigorously for six hours at 110°–112° C. under reflux. The product was worked up as in Example 3. The compound

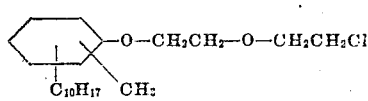

was obtained in 70% yield as a pale yellow oil boiling at 200°–206° C./4 mm. ($C_{10}H_{17}$ being probably the mixed bornyl and isobornyl group).

This material was heated at 190°–200° C. for five hours with an aqueous solution containing the theoretical amount of sodium sulphite under pressure, while stirring as described in Example 3.

On cooling, a soapy mass was obtained, the active component of which corresponds to the formula

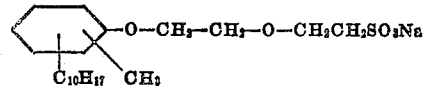

Example 6

In a similar manner, bornyl-β-naphthol gives, upon condensation with β,β'-dichlorodiethyl ether, the compound

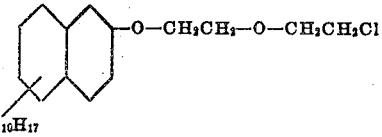

which is an oil boiling above 250° C./1 mm. Upon heating this compound with the theoretical amount of an aqueous solution of sodium sulphite at 180°–190° C., a soap-like product is obtained which can be used for breaking petroleum emulsions.

Example 7

A mixture consisting of 299 g. of β-chloroethoxy-β'-chlorodiethyl ether, 18.7 g. of sodium hydroxide, 25 g. of water, and 92 g. of mixed terpenic phenols (B. P. 140°–160° C./1 mm. obtained by condensing pinene or rectified turpentine with phenol) was stirred vigorously and heated under reflux for six hours at 110°–115° C. The product obtained as described above, boiling at 220°–230° C./4 mm., has the formula

where $C_{10}H_{17}$ represents very probably the mixed bornyl and isobornyl groups.

A mixture consisting of 89 g. of the above chloride, 28.6 g. of sodium sulphide (97%) and 600 cc. of water was heated for 1½ hours at 190°–200° C. while stirring, in an autoclave at 200 lbs./square inch. Upon cooling, a white, pasty mass was obtained which was treated at 90° C. with 20 cc. of 10% hydrochloric acid until no more sulphur dioxide was evolved. The product was neutralized with 10% caustic soda solution (8 cc. required). The final product analyzed:

| | Per cent |
|---|---|
| Solids | 26.5 |
| NaCl | 6.4 |
| Na₂SO₃ | 0.04 |

Its active component corresponds to the formula

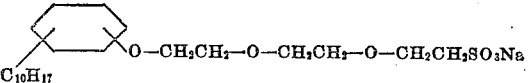

This compound is a detergent. It is stable to acids, alkalies, and hard water and possesses to a high degree the properties of deflocculation, wetting, penetrating and quick rinsability.

Example 8

By using 273.6 g. of β,β'-dichloro-diisopropyl ether, 92 g. of mixed terpenic phenols from turpentine and phenol, 18.7 g. of sodium hydroxide and 25 cc. of water and proceeding as in Example 3, there was obtained a 66% yield of a chloroether of the formula

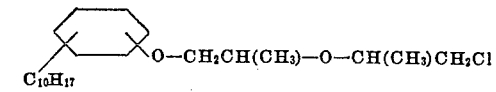

as a pale yellow oil boiling at 190°–200° C./4 mm.

Upon sulphonation at 30°–40° C. with one mol equivalent of chlorosulphonic acid, it readily formed the water-soluble sulphonic acid

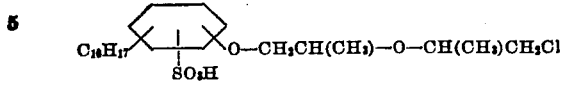

which was neutralized with sodium hydroxide solution and heated with a slight excess of aqueous sodium sulphite at 180°–185° C. for five hours to replace the terminal chlorine atom with an —$SO_3Na$ group. The product is useful as a scouring agent.

*Example 9*

A mixture consisting of 92 g. of decahydro-β-naphthylphenol, 228 g. of β,β'-dichlorodiethyl ether, 18.7 g. of caustic soda, and 25 cc. of water was stirred and heated under reflux for six hours at 110°–115° C. Upon working up the reaction mixture as described in Example 1, there was obtained an 82% yield of β-(decahydro-β-naphthyl-phenoxy)-β'-chlorodiethyl ether as a colorless oil boiling at 215°–220° C./4 mm., having the formula

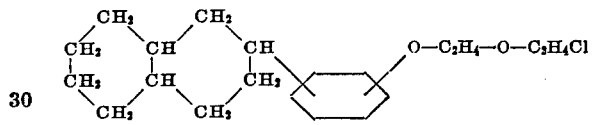

One mol equivalent of this oil was heated with an excess of potassium sulphite in aqueous solution for five hours at 190°–200° C. in a stirring autoclave. A soap-like mass was obtained, the active component of which is

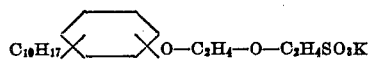

It is useful for dispersing and emulsifying.

*Example 10*

In an analogous manner to that set forth in Example 9, tetrahydro-abietylphenol gives, upon condensation with β-chloro-ethoxy-β'-chlorodiethyl ether, the compound

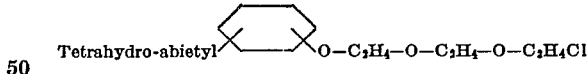

which is a yellow oil boiling above 250° C./1 mm. Upon heating this compound with excess sodium sulphite in aqueous solution at 190° C. for four hours, the product becomes water-soluble and gives a white, gelatinous mass, useful as an emulsifying agent.

The tetrahydro-abietylphenol is obtained by condensing phenol with tetrahydroabietinol.

Other cycloaliphatic phenols or naphthols corresponding to the formula R—R'—OH of the type set forth herein may be condensed with dichloro-polyalkylene ethers and polyethers to yield similar cycloaliphatic aryloxy polyalkylene ether chlorides which, with or without prior sulphonation of the aromatic nucleus, form desirable and useful capillary-active substances when treated with alkali metal sulphites.

Those compounds which contain a large cycloaliphatic group attached to the aromatic nucleus are particularly useful for washing etc. at the higher temperatures. Increasing the size of the cycloaliphatic group does not tend to decrease the solubility of the salts as is the case when the size of the aliphatic group in the well-known soaps is increased.

It has been found that the introduction of one or more sulphonic acid groups into the aromatic nucleus R produces compounds which are highly resistant to the action of hard water.

These new compounds are useful as wetting, emulsifying and cleansing agents, particularly for the following purposes:

In the textile industry—
As a wetting agent or assistant in dyeing, mercerizing, washing, laundering, especially for improving rinsability, and for sizing both fabrics and paper. They are particularly effective in removing solid particles of dirt from fabrics. They are also very useful in desizing operations, particularly in those in which enzymes are employed.

In the preparation of emulsions—
For spinning and throwing oils, cutting oils, insecticides, finishing compounds containing waxes and oils, for dispersing pigments and dyes for rubber, inks and leather finishes.

In cleaning operations—
For windows, floors, walls; preparing metals for subsequent coating operations, removing residues of insecticide sprays from fruit; removing printers' ink from paper; washing old felts in paper manufacture; removing dust from the air in air-conditioning systems.

As wetting or spreading agents—
For insecticides, parasiticides, fungicides and pest-repellants on plants, animals, fabrics, building materials, etc.; for increasing the absorptive power of paper towels and cotton; for wetting-out or wetting-back leather; in quench baths; in fatty oil soaps; breaking petroleum emulsions and removal of dispersed salt from oils.

It has also been found that these new compounds have a definite fungicidal an bactericidal action.

I claim:
1. As capillary-active substances, water-soluble sulphonates which in the acidic form have the general formula R—R'—O—A—$SO_3H$ in which R is a cycloaliphatic hydrocarbon radical, R' is a radical selected from the benzene and naphthalene series, and A is a polyalkylene ether radical in which each alkylene group contains at least two carbon atoms.

2. As capillary-active substances, water-soluble sulphonates which in the acidic form have the general formula R—R'—O—A—$SO_3H$ in which R is a cycloaliphatic hydrocarbon radical having a hydrocarbon group substituted therein, R' is a radical selected from the benzene and naphthalene series, R and R' being connected by nuclear carbon atoms, and A is a polyalkylene ether radical in which each alkylene group contains at least two carbon atoms.

3. As capillary-active substances, water-soluble sulphonates which in the acidic form have the general formula R—R'—O—A—$SO_3H$ in which R is a cycloaliphatic hydrocarbon radical containing at least ten carbon atoms, R' is a radical selected from the benzene and naphthalene series, and A is a polyalkylene ether radical in which each alkylene group contains at least two carbon atoms.

4. As capillary-active substances, water-soluble sulphonates which in the acidic form have the general formula R—R'—O—A—$SO_3H$ in which R is a terpenic hydrocarbon radical, R' is a radical selected from the benzene and naphthalene series, and A is a polyalkylene ether radical in which each alkylene group contains at least two carbon atoms.

5. As capillary-active substances, water-soluble sulphonates which in the acidic form have the general formula

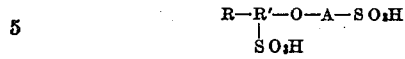

in which R is a cycloaliphatic hydrocarbon radical, R' is a radical selected from the benzene and naphthalene series, and A is a polyalkylene ether radical in which each alkylene group contains at least two carbon atoms.

6. As capillary-active substances, water-soluble sulphonates which in the acidic form have the general formula

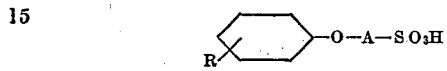

in which R is a cycloaliphatic hydrocarbon radical containing at least ten carbon atoms and A is a polyalkylene ether radical in which each alkylene group contains at least two carbon atoms.

7. As capillary-active substances, water-soluble sulphonates which in the acidic form have the general formula

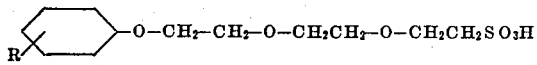

in which R is a cycloaliphatic hydrocarbon radical containing at least ten carbon atoms.

8. As capillary-active substances, water-soluble sulphonates which in the acidic form have the general formula

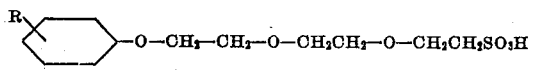

in which R is a member of the group consisting of polycyclic terpenic and polycyclic hydroaromatic hydrocarbon radicals containing at least ten carbon atoms.

9. As new compositions of matter, salts of the general formula

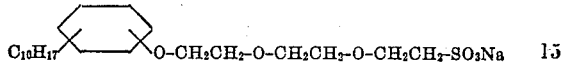

where $C_{10}H_{17}$ is a terpenic hydrocarbon group.

10. As new compositions of matter, salts of the general formula

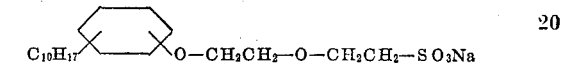

where $C_{10}H_{17}$ is a terpenic hydrocarbon group.

11. As new compositions of matter, salts of the general formula

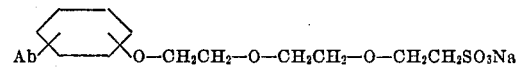

where Ab is the tetrahydro-abietyl group.

HERMAN A. BRUSON.